US010807570B2

(12) United States Patent
Giraud et al.

(10) Patent No.: US 10,807,570 B2
(45) Date of Patent: Oct. 20, 2020

(54) EYE TRACKING TO SAVE WASHING LIQUID

(71) Applicant: Valeo Systèmes d'Essuyage, Le Mesnil Saint Denis (FR)

(72) Inventors: Frédéric Giraud, Le Mesnil Saint Denis (FR); Philippe Billot, Le Mesnil Saint Denis (FR); Gilles Le-Calvez, Le Mesnil Saint Denis (FR); Marcel Trebouet, Le Mesnil Saint Denis (FR)

(73) Assignee: Valeo Systèmes d'Essuyage, Le Mesnil Saint Denis (FR)

(*) Notice: Subject to any disclaimer, the term of this patent is extended or adjusted under 35 U.S.C. 154(b) by 120 days.

(21) Appl. No.: 15/993,060

(22) Filed: May 30, 2018

(65) Prior Publication Data

US 2018/0345916 A1 Dec. 6, 2018

(30) Foreign Application Priority Data

Jun. 2, 2017 (FR) ...................................... 17 54896

(51) Int. Cl.
B60S 1/48 (2006.01)
B60S 1/52 (2006.01)
(Continued)

(52) U.S. Cl.
CPC .............. B60S 1/485 (2013.01); B60S 1/0822 (2013.01); B60S 1/0844 (2013.01); B60S 1/524 (2013.01);
(Continued)

(58) Field of Classification Search
CPC ........ B60S 1/485; B60S 1/524; B60S 1/0844; B60S 1/0822; B60S 1/04; B60S 1/34;
(Continued)

(56) References Cited

U.S. PATENT DOCUMENTS

2008/0065291 A1* 3/2008 Breed .................... B60N 2/002
701/36
2012/0169582 A1* 7/2012 Tschirhart .............. G02B 27/01
345/156

FOREIGN PATENT DOCUMENTS

DE 102011116618 A1 4/2013
DE 102014210608 A1 12/2015
(Continued)

OTHER PUBLICATIONS

JP2006143150; Suzuki et al.; Machine translation (Year: 2006).*
(Continued)

*Primary Examiner* — Mikhail Kornakov
*Assistant Examiner* — Natasha N Campbell
(74) *Attorney, Agent, or Firm* — Osha Liang LLP

(57) ABSTRACT

The invention relates to a cleaning system (14) for a windscreen (34) of a motor vehicle (32), comprising at least one drive arm (2) and at least one wiper blade (1, 1a, 1b), the wiper blade (1, 1a, 1b) being connected to the drive arm (2), the cleaning system (14) having at least one projection device (13) able to project a liquid onto the windscreen (34), characterized in that the cleaning system (14) comprises a determination element (16) for a zone (23) of the windscreen (34) and an activation means (15) of the determination element (16), an activation of the drive arm (2) and of the projection device (13) being subject to image information (18) as to a position of the zone (23) on the windscreen (34) transmitted by the determination element (16).

6 Claims, 5 Drawing Sheets

(51) Int. Cl.
*B60S 1/08* (2006.01)
*G06K 9/00* (2006.01)

(52) U.S. Cl.
CPC ..... *G06K 9/00389* (2013.01); *G06K 9/00832* (2013.01)

(58) Field of Classification Search
CPC ......... B60S 1/38; B60S 1/46; G06K 9/00389; G06K 9/00832
See application file for complete search history.

(56) References Cited

FOREIGN PATENT DOCUMENTS

| | | |
|---|---|---|
| EP | 2639121 A2 | 9/2013 |
| JP | 2006143150 A | 6/2006 |
| JP | 2007055562 A | 3/2007 |
| JP | 2010064640 A | 3/2010 |

OTHER PUBLICATIONS

EP 2639121; Duval et al.; Machine translation (Year: 2013).*
Preliminary Search Report and Written Opinion issued in corresponding French Patent Application No. 1754896, dated Feb. 20, 2018 (10 pages).

* cited by examiner

EYE TRACKING TO SAVE WASHING LIQUID

The present invention involves cleaning systems for a motor vehicle, and more particularly cleaning systems for the front glass surfaces of these motor vehicles.

Motor vehicles are commonly equipped with a wiping system to provide a wiping and washing of the windscreen or the rear window and to prevent the driver's view of his or her surroundings being disturbed. These wiping systems are typically driven by a drive arm performing an angular back and forth movement and have elongated wiper blades, which in turn carry wiping strips made of an elastic material. These strips rub against the glass surface and remove the water and/or grime, bringing them outside the field of vision of the driver.

In order to effectively wash this glass surface, these wiping systems typically comprise a reservoir containing a liquid which is to be projected onto the glass surface to be cleaned a few fractions of a second before the passage of the wiping strip of the wiper blade, which can then properly clean the grime present on this glass surface.

This cleaning liquid may be projected by a projection device situated on a bonnet or on a windscreen bay of a vehicle. Projection devices of this liquid may also be integrated directly in the wiper blades.

One drawback of the current wiping systems lies in the fact that the user is forced to use the same quantity of liquid whether he or she wishes to clean the entire surface of his or her windscreen or simply a portion thereof. As a result, the amount of liquid used is often disproportionate to the surface of the windscreen to be cleaned, while environmental constraints urge motor industry stakeholders to limit the impact of the vehicles on the environment, especially as regards the consumption of water.

This situation gives rise to another drawback: this liquid for cleaning the glass surface is contained in a reservoir which is dimensioned to contain a quantity of cleaning liquid adapted to a cleaning system which wets the entire glass surface. Such a reservoir is overdimensioned in relation to the quantity of liquid actually needed, which increases the total weight of the vehicle and its fuel consumption. This reservoir also takes up precious space in the vehicle which might be used for other purposes.

The present invention proposes remedying these drawbacks by proposing a cleaning system for a motor vehicle able to target the projection of cleaning liquid onto a precise zone of the windscreen, without wetting other zones of the windscreen. The means implemented by this targeting are most particularly suited to the automobile environment. It will thus be understood that by proposing cleaning only the zone of the windscreen which is soiled by a simple command, the present invention makes it possible to reduce the consumption of cleaning liquid, and consequently the size of the reservoir containing this liquid.

Since the reservoir is smaller, the vehicle is more lightweight, which allows a reduction of its fuel consumption. The arrangement of other components of the vehicle is likewise facilitated by the space freed up in the windscreen bay or in the front compartment of the vehicle.

The present invention thus relates to a cleaning system for a windscreen of a motor vehicle, comprising at least one drive arm and at least one wiper blade, the wiper blade being connected to the drive arm, the cleaning system having at least one projection device able to project a liquid onto the windscreen. According to the invention, the cleaning system comprises a determination element for a zone of the windscreen and an activation means of the determination element, an activation of the drive arm and of the projection device being subject to image information as to a position of the zone on the windscreen transmitted by the determination element.

According to the present invention, the projection device of the cleaning system is carried by a wiping device, this wiping device comprising the wiper blade and the drive arm to which it is connected. It will thus be understood that, according to the present invention, the projection device may be carried either by the drive arm and/or by the wiper blade of the wiping device.

The determination element, whatever its embodiment, is a device able to isolate a limited zone of the windscreen which is less than the total surface of the windscreen.

The activation means, for its part, is any means which allows the functioning of the determination element such that the latter only identifies the zone which is to be cleaned when the activation means requests such of it. One thus avoids any untimely functioning of the cleaning system according to the invention.

It will be noted that it is not a question here of specifically directing a jet of cleaning liquid onto grime, as such a system involves means which are not economically compatible with the economic constraints of the automobile environment. On the contrary, the system according to the invention utilizes technical means compatible with these economic constraints by making the choice to clean one zone of the windscreen, that is, a reasonable and organized subdivision of the surface of the windscreen.

According to one characteristic of the present invention, the image information as to the position of the zone on the windscreen can be received by a control module of the drive arm and of the projection device.

Advantageously, the cleaning system thus comprises two wiping devices respectively designed to be mounted on the driver side and the passenger side of the vehicle. According to the present invention, each wiping device is then equipped with a projection device, this projection device being possibly carried by the drive arm of the particular wiping device and/or by the wiper blade of this wiping device.

According to one aspect of the present invention, the windscreen is virtually sliced up into several zones corresponding to angular sectors in the plane of the windscreen, these angular sectors being for example likewise subdivided to form said zones. Depending on the zone determined by the determination element, the liquid is projected onto said determined zone of the windscreen from the projection device of one of the two wiping devices. Thus, the quantity of liquid used is reduced, which makes it possible to reduce the size of the reservoir containing this liquid and therefore consequently to decrease the weight and the fuel consumption of the vehicle.

According to one aspect of the present invention, the activation means is for example a switch, a first position of which enables the activation, that is, its placement in operation, of the determination element, and a second position of which enables the deactivation, that is, the taking out of operation, of this determination element and a return to a so-called "typical" cleaning system, that is, a cleaning system designed to clean indiscriminately all the zones of the surface of the windscreen.

According to various exemplary embodiments of the present invention, the determination element and the control module may form a single unit or be comprised in two distinct housings.

According to one characteristic of the present invention, the projection device comprises a first part and a second part, each one assigned to different zones of the windscreen, the projection device having control means designed for an independent projection of each of the parts of the projection device.

It will thus be understood that the first part and the second part are controlled independently of each other, making it possible to be involved in the targeting of the cleaning and thus to reduce the quantity of liquid used. Thus, depending on the zone of the windscreen determined by the determination element, one or the other of the parts of the projection device of the wiping device will be used to project the liquid onto the windscreen, and more particularly onto the zone determined, the other part of the projection device being stopped.

According to one exemplary embodiment of the present invention, the first part of the projection device has an admission opening designed to allow an admission of the liquid into this first part, the second part of the projection device has an admission opening designed to allow an admission of the liquid into this second part, the admission opening of the first part and the admission opening of the second part being distinct from each other.

According to another exemplary embodiment of the present invention, the first part of the projection device and the second part of the projection device have a common admission opening to allow the admission of the liquid into the first part of the projection device and into the second part of this projection device. According to this embodiment of the present invention, the liquid is directed toward one or the other of these parts by virtue of a valve.

When the projection device is carried by the wiper blade, the first part and the second part of this projection device may be arranged, for example, on either side of a connection device between the drive arm and the wiper blade.

According to one variant embodiment of the present invention, the projection device may comprise more than two parts, for example three parts, each part being designed to clean different zones of the windscreen.

According to a first embodiment of the present invention, the determination element is designed to detect a direction in which a driver of the vehicle is looking.

According to this first embodiment, the driver activates the determination element thanks to the activation means and looks in the direction of the zone of the windscreen that he or she wants to see cleaned. The determination element thus detects this zone thanks to the direction of looking of the driver.

According to a second embodiment of the present invention, the determination element is designed to detect a direction of a movement of the driver.

Specifically, according to this second embodiment, the determination element is designed to detect a direction of an upper limb of the driver, such as a direction of an arm, a hand, or a finger of this driver.

According to this second embodiment, after having activated the determination element, the driver shows the zone to be cleaned and the determination element detects and analyses the gesture and the direction of this gesture, to deduce therefrom the position of the zone of the windscreen to be cleaned.

According to one or the other of these embodiments, the determination element comprises at least one camera and image processing software. By comparing the direction of looking or gesturing of the driver and a previously recorded virtual slicing of the windscreen, the determination element is able to determine which zone of the windscreen has been designated by this driver and thus to transmit the image information as to the position of this zone on the windscreen to the control module. Keep in mind that, according to the invention, the control module and the determination element may be grouped in the same housing and the two steps of determining the zone of the windscreen and transmitting the information may then be combined into a single step.

According to a third embodiment of the present invention, the determination element is a screen, for example a touchscreen on which different zones of the windscreen are projected.

According to this third embodiment, the driver selects the zone of the windscreen on this touchscreen integrated in the vehicle, and on which the different zones of the windscreen are projected.

According to one aspect of this third embodiment, the determination element is designed to detect a pressure applied by the driver to a region of the screen on which the different zones of the windscreen are projected.

By comparing the region of the screen where the pressure is applied by the driver with the virtual slicing up of the windscreen, the determination element can determine the zone of the windscreen selected by the driver.

Alternatively, the selection of the region of the screen corresponding to the zone of the windscreen to be cleaned can be realized by external commands, that is, without there being any direct contact between the driver of the vehicle and the screen on which are projected the different zones of the windscreen. Thus, the determination element can be designed to detect a selection of a zone of the windscreen produced by means of a device which is remote from the screen. Such a device is here for example a control knob or a pad.

The invention likewise relates to a motor vehicle comprising at least one cleaning system according to the present invention.

According to one characteristic of the present invention, the control module of the cleaning system is an electronic control housing of the motor vehicle.

The invention likewise relates to a method of cleaning a zone of a windscreen of a motor vehicle involving at least one step of activation of a determination element for a zone of the windscreen, a step of determination of a zone of the windscreen by this determination element, a step of placing in motion a drive arm of a wiping device of the windscreen, and a step of turning on a projection device of a liquid when a wiper blade carried by the drive arm enters the zone of the windscreen.

As previously mentioned, the cleaning system according to the present invention may comprise a control module of the drive arm and of the projection device. In this configuration, the control module receives the image information as to the position of the zone of the windscreen determined and consequently initiates the step of placing the drive arm in movement, and then the step of turning on the projection device of the liquid when the wiper blade enters into said zone of the windscreen.

Advantageously, this method may likewise involve a step of stopping the projection device when the wiper blade leaves the zone of the windscreen. Once the projection device is stopped, the direction of movement of the drive arm is reversed so that it may return to an initial position.

Other details, characteristics and advantages will emerge more clearly upon reading the detailed description given below as an illustration in relation to the different embodiments shown in the following figures.

Figure 1:
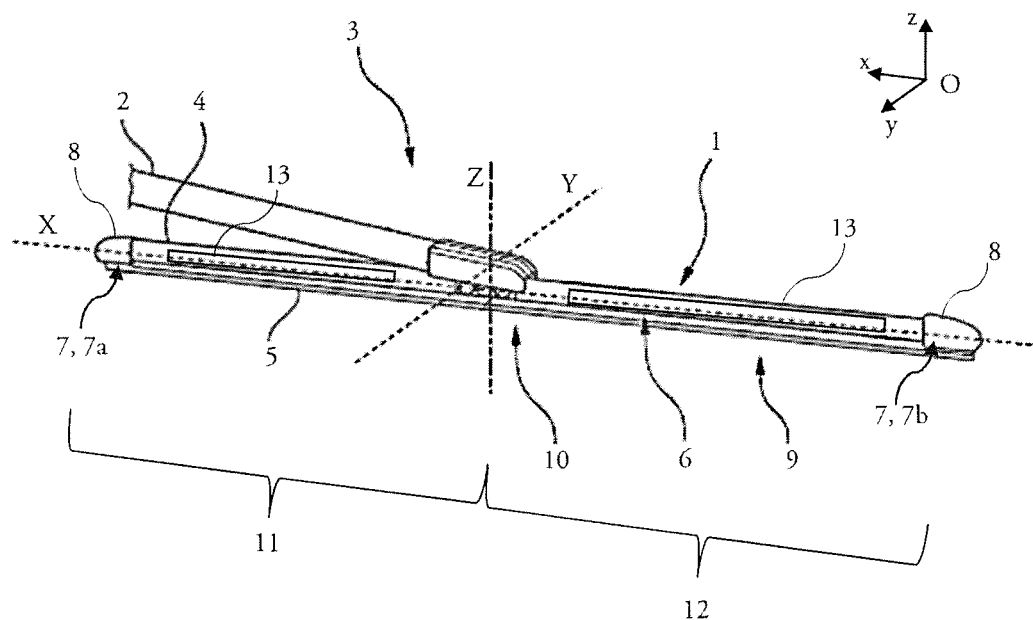
FIG. 1 is a schematic perspective representation of a wiping device of a cleaning system according to the present invention.

In the figures, the terms longitudinal, transverse, vertical, lateral, left, right, upper, lower refer to the orientation, in an orthonormal reference system Oxyz, of a wiper blade 1 as illustrated in FIG. 1. In this reference system, the axis Ox represents the longitudinal direction, the axis Oy represents the transverse direction, and the axis Oz represents the vertical direction of the wiper blade. In this reference system, a longitudinal plane is parallel to the plane Oxz, a transverse plane is parallel to the plane Oxy and a vertical plane is parallel to a plane Oyz.

In FIG. 1, a wiper blade 1 of the present invention extends along a longitudinal axis X, parallel to the axis Ox. The terms left and right pertain to a position along a transverse axis Y, parallel to the axis Oy, on either side of the longitudinal axis X. A vertical axis Z symbolizes a vertical direction, parallel to that of the axis Oz, which is perpendicular to the longitudinal and transverse directions described above.

For the longitudinal direction, the terms exterior and interior pertain to a pivoting point of a wiper blade 1 on a drive arm 2, the term interior corresponding to the part where the drive arm and a half-blade extend, and the term exterior corresponding to the part where the other half-blade extends.

A motor vehicle is commonly equipped with a wiping device 3 to remove water and/or grime present on a glass surface, especially a rear window or a front windscreen of a motor vehicle. As illustrated in FIG. 1, the wiping device 3 comprises the drive arm 2 which is able to execute an angular back and forth motion along and on top of the glass surface.

The wiping device 3 also comprises the wiper blade 1 which extends along the longitudinal axis X. The wiper blade 1 comprises a wiping strip 5 which likewise extends along this longitudinal axis X and at least one air deflector 4. The air deflector 4 is provided to transform a pressure applied by a flow of air circulating along the glass surface into a bearing force of the wiper blade 1 against the glass surface of the motor vehicle.

The wiping strip 5 is the part of the wiper blade 1 in direct contact with the glass surface to remove the water and/or the grime present on the latter. The wiping strip 5 is for example a flexible strip made of an elastic material, such as a polymer or a rubber, in particular.

The wiper blade 1 also comprises a structure element 6 which gives the wiper blade 1 a certain deformation in the plane Oxz, so as to distribute the bearing force of the drive arm 2 along the wiper blade 1. This deformation also allows the wiper blade 1 to adapt to the curve of the glass surface. Such a structure element 6 may be formed, for example, by a single bending element, or by a plurality of bending elements, or even by a support in which one or more bending elements are threaded.

The wiper blade 1 likewise comprises at each of its longitudinal ends 7 an end cap 8. Each end cap 8 is designed to hold together the wiping strip 5 and the structure element 6. Optionally, each end cap 8 may likewise cover an end portion of the air deflector 4.

The air deflector 4, the wiping strip 5 and the structure element 6 form a semi-rigid structure 9 which is carried by a connection device 10, inserted between an end portion of the drive arm 2 and the semi-rigid structure 9. Such a connection device 10 comprises, for example, a connector joined at least in isostatic manner to the semi-rigid structure 9, and an adapter joined by a pivot link to the connector.

The wiper blade 1 has an interior portion 11 and an exterior portion 12 aligned along the longitudinal axis X. As is represented in FIG. 1, the interior portion 11 and the exterior portion 12 of the wiper blade 1 are respectively comprised between one of its longitudinal ends 7 and the connection device 10, this connection device 10 being the pivot point of the wiper blade 1 on its drive arm 2.

The interior portion 11 of the wiper blade 1 is thus bounded longitudinally by the connection device 10 on the one hand and by the closest longitudinal end 7 to a point of rotation between the drive arm 2 and the vehicle on which the wiping device 3 is mounted, on the other hand, this longitudinal end 7 being called hereafter the "interior longitudinal end 7a".

The exterior portion 12 of the wiper blade 1 for its part is bounded on the one hand by the connection device 10 and on the other hand by the furthest longitudinal end 7 from the point of rotation between the drive arm 2 and the vehicle on which the wiping device 3 is mounted, this longitudinal end 7 being called hereafter the "exterior longitudinal end 7b".

The wiping device 3 likewise comprises at least one projection device 13 of a liquid onto the glass surface to facilitate the cleaning of grime. According to the invention, this projection device 13 may comprise several parts, each of them designed to project the liquid onto particular zones of the glass surface.

According to one exemplary embodiment, illustrated for example in FIG. 1, the projection device 13 is carried by the wiper blade 1 and it comprises a first part 25 and a second part 26, each of them assigned to one portion 11, 12 of the wiper blade 1. This first part 25 and this second part 26 may for example be arranged on either side of the connection device 10 between the drive arm 2 and the wiper blade 1.

Moreover, the first part 25 and the second part 26 may be controlled in independent fashion, which takes part in the targeting of the cleaning made possible by the present invention. This projection device 13 will be described more fully in the rest of the description.

This projection device 13 is activatable manually and/or automatically by a driver and it is designed to project the liquid along the displacement of the wiper blade 1 onto the glass surface. Advantageously, the present invention proposes a cleaning system comprising the wiping device 3 and enabling a targeted cleaning. According to the invention, a driver of the vehicle on which the cleaning system is mounted can indicate a zone of the glass surface where the grime is present and where the cleaning should be performed.

According to another exemplary embodiment, not illustrated here, the projection device is carried by the drive arm to which the wiper blade is connected. According to this other exemplary embodiment, the projection device may comprise several parts, each of them oriented differently from the others, so as to be able to project the liquid onto the particular zones of the windscreen.

The cleaning system according to the present invention is particularly suitable for use on a front windscreen of a motor vehicle.

Figure 2:
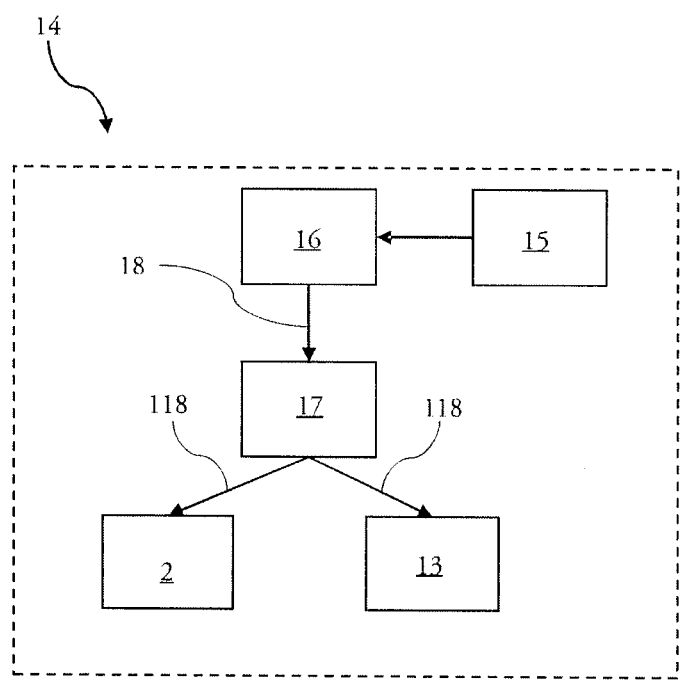
FIG. 2 is a schematic, synoptic view of the functioning of the cleaning system according to the present invention, comprising among other things the wiping device as illustrated in FIG. 1.

FIG. 2 illustrates, in synoptic form, one implementation of the cleaning system 14 according to the present invention.

The cleaning system 14 according to the present invention comprises an activation means 15 of a determination element 16 for a zone of the windscreen, a control module 17 and at least one wiping device in which the projection device 13 is integrated, as previously described and comprising in particular the drive arm 2 and the wiper blade carried by this drive arm 2. Advantageously, the cleaning system 14 according to the present invention comprises two wiping devices, one being mounted on the driver side of the vehicle and the other being mounted on the passenger side of this same vehicle.

The cleaning system 14 according to the present invention allows the driver to clean only one zone of his or her windscreen, that is, it allows him or her to initiate a targeted cleaning, consuming less liquid that a cleaning of the entire surface of the windscreen.

As is represented in FIG. 2, the driver of the vehicle first needs to activate the determination element 16 for the zone for the windscreen by using the activation means 15.

This activation means 15 may be for example a switch which can assume two positions, one of them allowing the activation of the determination element 16 and the other allowing adeactivating of this determination element 16. It will be understood that if the activation of the determination element 16 enables a targeted cleaning of the windscreen, its deactivation results in a "typical" cleaning, that is, the cleaning system will clean the entire surface of the windscreen, without distinction of zones. Thus, the deactivation of the determination element 16 thanks to the activation means 15 prevents an untimely operation of the cleaning system by the least gesture, look, or touch.

This determination element 16 is designed to determine the zone of the windscreen that the driver wishes to clean. As shall be described more fully below, this determination element 16 may assume various forms, according to different embodiments of the present invention. Once the zone of the windscreen has been determined, the determination element 16 sends to the control module 17 image information 18 as to a position of this zone on the windscreen.

The information 18 may be, for example, a binary or complex signal circulating through a multiplexed network of the vehicle on which the cleaning system 14 is designed to be mounted.

The control module 17 then calculates an instruction 118 which it transmits to the drive arm 2 of the wiping device 3, and to the projection devices 13 carried by this wiping device, as previously described. The drive arm 2 is thus set in motion so as to reach the zone of the windscreen as determined by the determination element 16. When one of the wiper blades of the wiping device enters the zone determined, the liquid projection device 13 is triggered to project the liquid onto this zone of the windscreen.

The cleaning system 14 according to the present invention may likewise be designed such that the projection of liquid by the projection device 13 stops when the wiper blade leaves the particular zone of the windscreen.

According to this configuration, when the wiper blade leaves the zone determined by the determination element 16, the control module 17 stops the projection of liquid by the projection device 13 and changes the direction of movement of the drive arm 2 so that it resumes its initial position, that is, a position at the foot of the windscreen.

According to the present invention, the control module and the determination element may form a single unit or two distinct units.

When they form only a single unit, the step of transmission of the image information as to the position of the zone on the windscreen is direct and does not pass through a wiring external to the housing, since the control module is merged with the determination element which itself determines this position of the zone on the windscreen.

When the control module and the determination element are formed by two distinct units, the determination element transmits the image information as to the position of the determined zone of the windscreen to the control module, for example, by wire. Thus, it will be understood that, according to this configuration, the determination element and the control module are two distinct units connected by a cable and the image information as to the position of the determined zone of the windscreen goes from the determination element to the control module via this cable.

Figure 3:
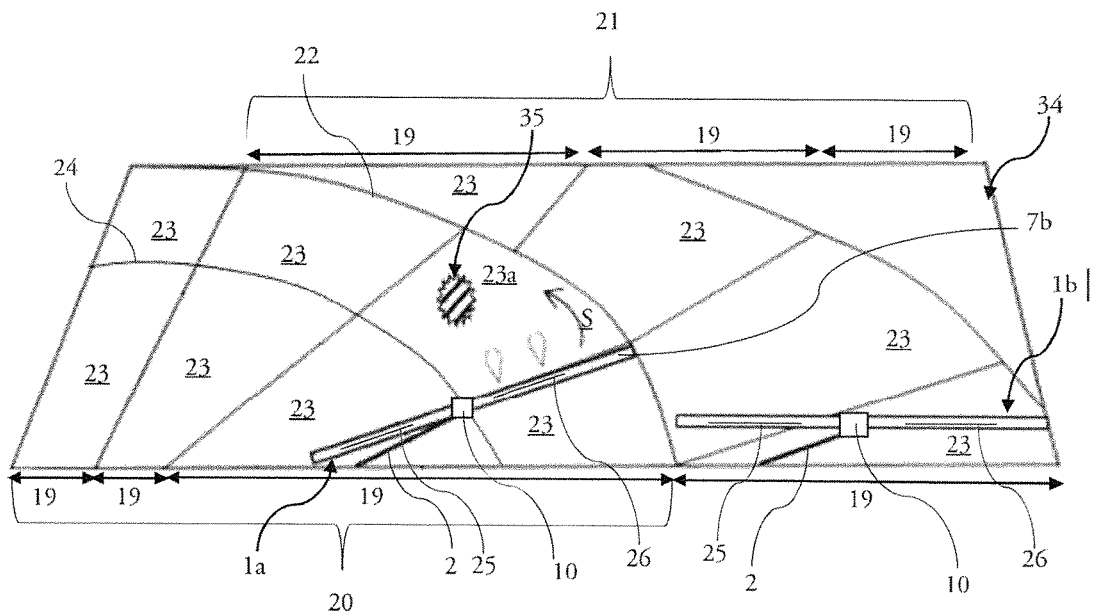
FIG. 3 is a schematic representation of a virtual slicing up of a windscreen which is to be cleaned by the cleaning system according to the present invention.

It will thus be understood that, according to the present invention, the windscreen is virtually sliced up into several zones, this virtual slicing being illustrated schematically, for example, in FIG. 3.

As can be seen in FIG. 3, the windscreen 34 is thus virtually sliced up for example into seven angular sectors 19, a first group 20 of three angular sectors 19 being accessible by a first wiper blade 1a mounted on the driver side and a second group 21 of four angular sectors 19 being accessible by a second wiper blade 1b mounted on the passenger side. By "accessible" is meant that the wiper blade 1a, 1b in question can sweep over a surface of the windscreen 34 covered by the first group 20 of three angular sectors 19 or by the second group 21 of four angular sectors 19.

The separation between the first group 20 of angular sectors 19 and the second group 21 of angular sectors 19 may be materialized by a first curve 22 along which the exterior longitudinal end 7b of the first wiper blade 1a travels when it is in movement.

The first group 20 of three angular sectors 19 is subdivided to create seven distinct zones 23. This subdivision is realized at a second curve 24 along which the connection device 10 of the first wiper blade 1a travels when it is in movement. The first group 20 of angular sectors 19 thus comprises four exterior zones 23 and three interior zones 23, these zones 23 being respectively accessible by the exterior portion of the first wiper blade 1a and by the interior portion of this first wiper blade 1a, as previously described.

The second group 21 of four angular sectors 19 for its part forms four zones 23 of the windscreen 34.

FIG. 3 likewise shows in schematic fashion the step of projection of the liquid onto the determined zone 23a of the windscreen 34. As illustrated, this projection of liquid occurs when the actuated wiper blade 1a, 1b, in the present case the first wiper blade 1a, enters the zone 23a of the windscreen 34 determined by the determination element. FIG. 3 represents an arrow S indicating the direction of displacement of this first wiper blade 1a before the liquid is projected, as well as grime 35 which is to be cleaned in the determined zone 23.

It will thus be understood that the first wiper blade 1a sweeps over the zone 23 of the windscreen 34 once the liquid has been projected. As was described in regard to FIG. 2, the projection of liquid ceases as soon as the first wiper blade 1a leaves the determined zone 23 of the windscreen 34. Once the grime 35 has been cleaned, the wiper blades 1a, 1b resume an initial position, that is, a position at the foot of the windscreen.

According to one exemplary embodiment shown in FIG. 3, each wiper blade 1a, 1b comprises a projection device. As can be seen, depending on the determined zone 23 of the windscreen 34, the projection device of one or the other of the wiper blades 1a, 1b is used. Moreover, as previously mentioned, each projection device comprises the first part 25 and the second part 26, each being assigned to one portion 11, 12 of the wiper blade 1a, 1b. Thus, depending on the determined zone 23, only one part 26 of the projection device of one of the wiper blades 1a may be triggered to project liquid onto the zone 23a of the windscreen 34, which in particular allows a further reduction in the quantity of liquid used.

According to one variant embodiment, not illustrated here, the projection devices are arranged on the drive arms to which the wiper blades are connected, the principle of operation being otherwise identical to that described above FIGS. 4 to 6 illustrate schematically different examples of projection devices 13 which can be integrated in the cleaning system according to the present invention. These examples are given only as an illustration and other configurations of wiping devices may be contemplated without leaving the scope of the invention.

Figure 4:
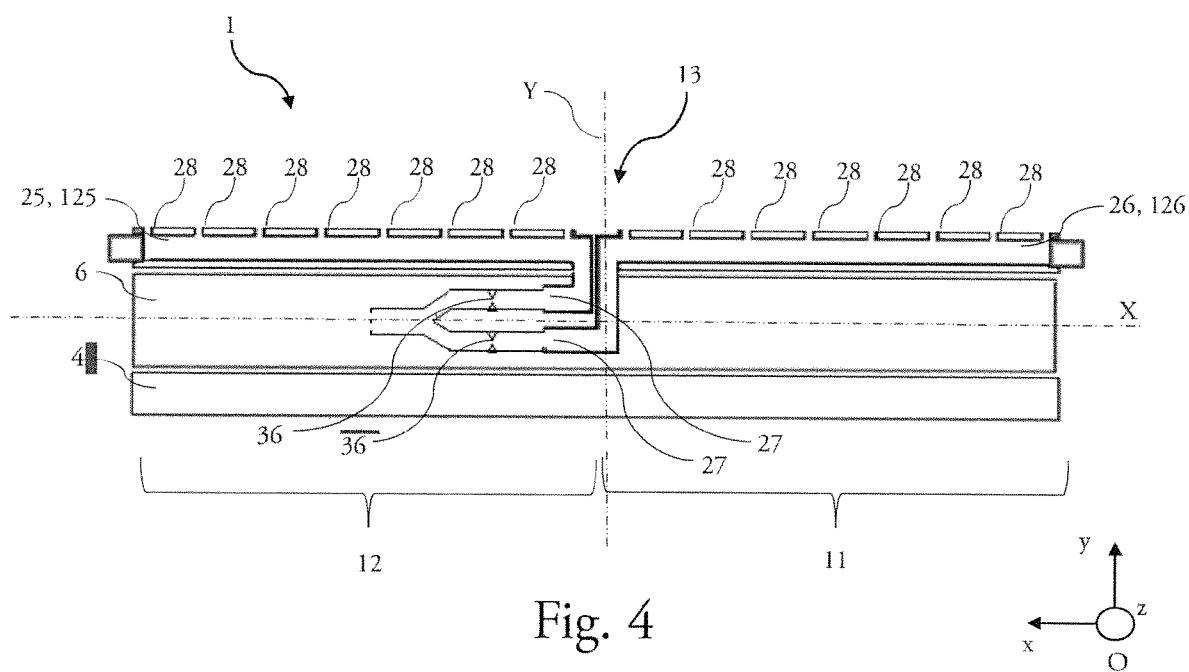
FIGS. 4 to 6 are schematic representations of liquid projection devices according to different exemplary embodiments of the cleaning system of the present invention.

FIG. 4 shows a cross section of a first example of a wiper blade 1 which may be integrated in the cleaning system according to the present invention, this cross section being produced in a transverse plane, parallel to the plane Oxy, and this cross section being viewed from above. Thus, there are illustrated in this figure, from bottom to top along the transverse axis Y, the air deflector 4, the structure element 6 and the projection device 13 of the wiper blade 1.

According to this first example, the first part 25 and the second part 26 of the projection device 13 are formed by channels, a first channel 125 being arranged on the exterior portion 12 of the wiper blade 1 and a second channel 126 being arranged on the interior portion 11 of the wiper blade 1. As illustrated, the first channel 125 and the second channel 126 both extend in parallel with the longitudinal axis X.

The first channel 125 and the second channel 126 each have an admission orifice 27 for the liquid to be projected onto the windscreen. This first channel 125 and this second channel 126 likewise comprise projection orifices 28 by which the liquid admitted into these channels 125, 126 is designed to exit to be projected onto the windscreen. Each of these channels 125, 126 thus have a series of projection orifices 28, aligned in succession along the longitudinal axis X.

It will be understood that the liquid only passes through these channels 125, 126 before being projected onto the determined zone of the windscreen. Thus, a reservoir of this liquid, not shown here, is integrated in the vehicle and sends the liquid to the projection device 13 on demand. The first channel 125 and the second channel 126 respectively have at least one means of opening/closing 36, for example arranged in the area of their admission orifice 27 for the liquid.

The projection device 13 may comprise means of control connected in independent manner to the means of opening/closing 36 of the first channel 125 and to the means of opening/closing 36 of the second channel 126.

These means of opening/closing 36 of the channels 125, 126 thus make it possible to project liquid only from the first channel 125 or only from the second channel 126, depending on the determined zone of the windscreen. These means of opening/closing 36 of the channels 125, 126 thus allow a reduction in the quantity of liquid projected onto the windscreen during the use of the cleaning system according to the present invention.

Figure 5:
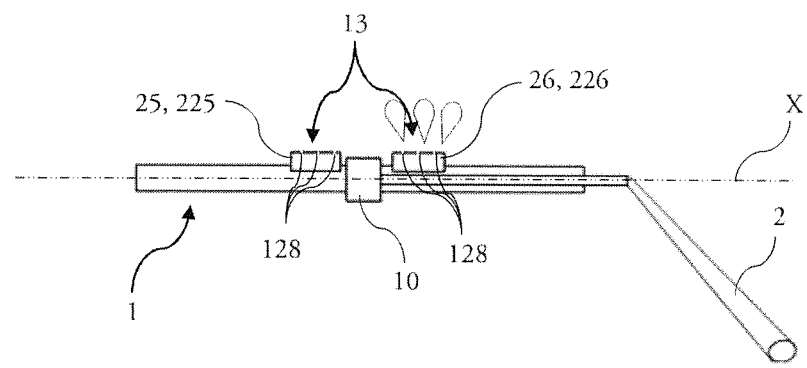

FIG. 5 illustrates a second example of a projection device 13. The wiper blade 1 is carried by its drive arm 2 and may be integrated in the cleaning system according to the present invention. According to this second example, the first part 25 and the second part 26 of the projection device 13 are formed by a first spray nozzle 225 and a second spray nozzle 226, for example arranged longitudinally on either side of the connection device 10 making possible the mechanical linkage between the drive arm 2 and the wiper blade 1. Each of these spray nozzles 225, 226 comprises an orifice for admission of liquid, not visible in this figure, as well as a plurality of projection orifices 128 by which the liquid is projected onto the windscreen. It will be understood that, as for the first example illustrated in FIG. 4, the orifice for admission of liquid of the first spray nozzle 225 is distinct from the orifice for admission of liquid of the second spray nozzle 226.

The second example of a projection device 13, formed here by a first spray nozzle 225 and a second spray nozzle 226, is distinguished from the first example of a projection device 13 by the fact that the first spray nozzle 225 and the second spray nozzle 226 are mounted on the wiper blade 1, whereas the projection device 13 according to the first example is integrated in the wiper blade 1, that is, cannot be dismounted from the wiper blade without destroying either the projection device or the wiper blade.

As before, the first spray nozzle 225 and the second spray nozzle 226 comprise means of opening/closing which are controllable independently of each other so as to use only the quantity of liquid needed for the cleaning of one of the zones of the windscreen.

The operating principle is identical to that of the first example illustrated and described with reference to FIG. 4.

According to one variant of this second exemplary embodiment, the first spray nozzle and the second spray nozzle making up the projection device may be carried by the drive arm of the wiping device. According to this variant, the first spray nozzle and the second spray nozzle are then oriented to enable the projection of liquid onto the entire windscreen, each spray nozzle being designed to project the liquid onto different zones of the windscreen from the ones accessible by the other spray nozzle.

Figure 6:
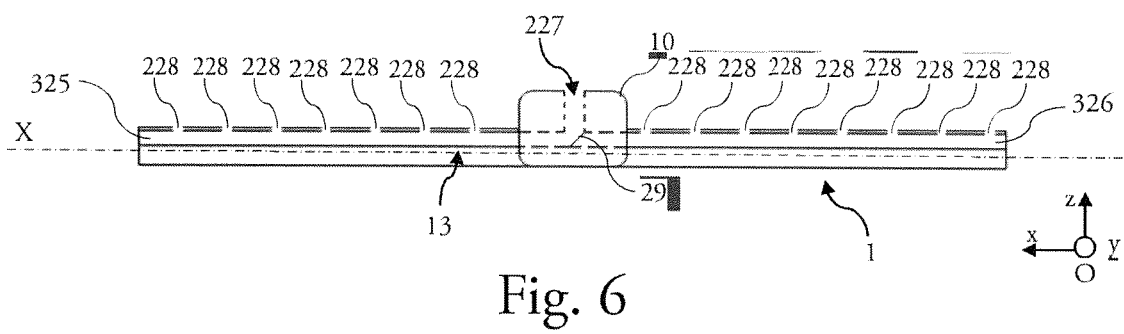

FIG. 6 for its part represents schematically a third example of a projection device 13 integrated in the wiper blade 1 of a cleaning system according to the present invention. According to this third example, the projection device 13 comprises a first tube 325 and a second tube 326, this first tube 325 and this second tube 326 extending respectively along the longitudinal axis X. As for the first example, the first tube 325 and the second tube 326 are an integral part of the wiper blade 1 and could only be separated from it by its destruction.

The first tube 325 and the second tube 326 share a single admission orifice 227. In other words, the first tube 325 and the second tube 326 have a common orifice for admission 227 of liquid. The liquid thus arrives from the reservoir as previously described, reaching this common admission orifice 227, where it is directed toward one or the other of the tubes 325, 326, thanks to a valve 29 which can move between at least two positions.

A first position of this valve 29 allows the projection of liquid by the first tube 325 and a second position of this valve 29 allows the projection of liquid by the second tube 326. According to the example illustrated in FIG. 6, the valve 29 is in its first position.

The first tube 325 and the second tube 326 each comprise a plurality of projection orifices 228, as previously described.

It will thus be understood that, depending on the zone of the windscreen determined upstream by the determination element, the control module is designed to orient the valve 29 so as to allow the projection of liquid by the projection orifices 228 of the first tube 325 or by the projection orifices 228 of the second tube 326 of the projection device 13, depending on the zone to be cleaned.

As previously described, the cleaning system according to the present invention comprises a determination element for the zone of the windscreen that the driver wishes to clean. This determination element may assume various forms, of which three examples are represented in FIGS. 7 to 9.

Figure 7:
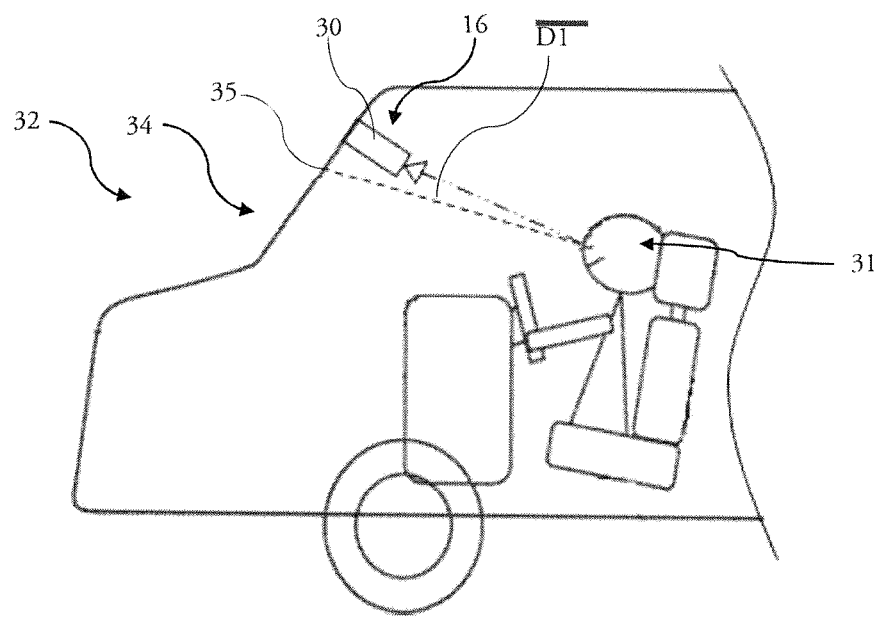
FIGS. 7 to 9 are schematic representations of detection elements for a zone of a windscreen according to different embodiments of the cleaning system of the present invention.
Figure 8:
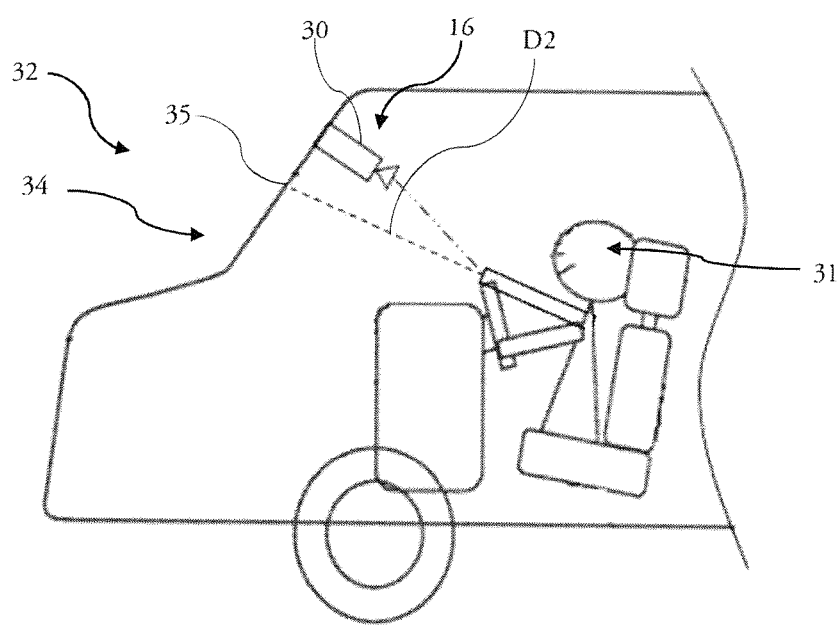
Figure 9:
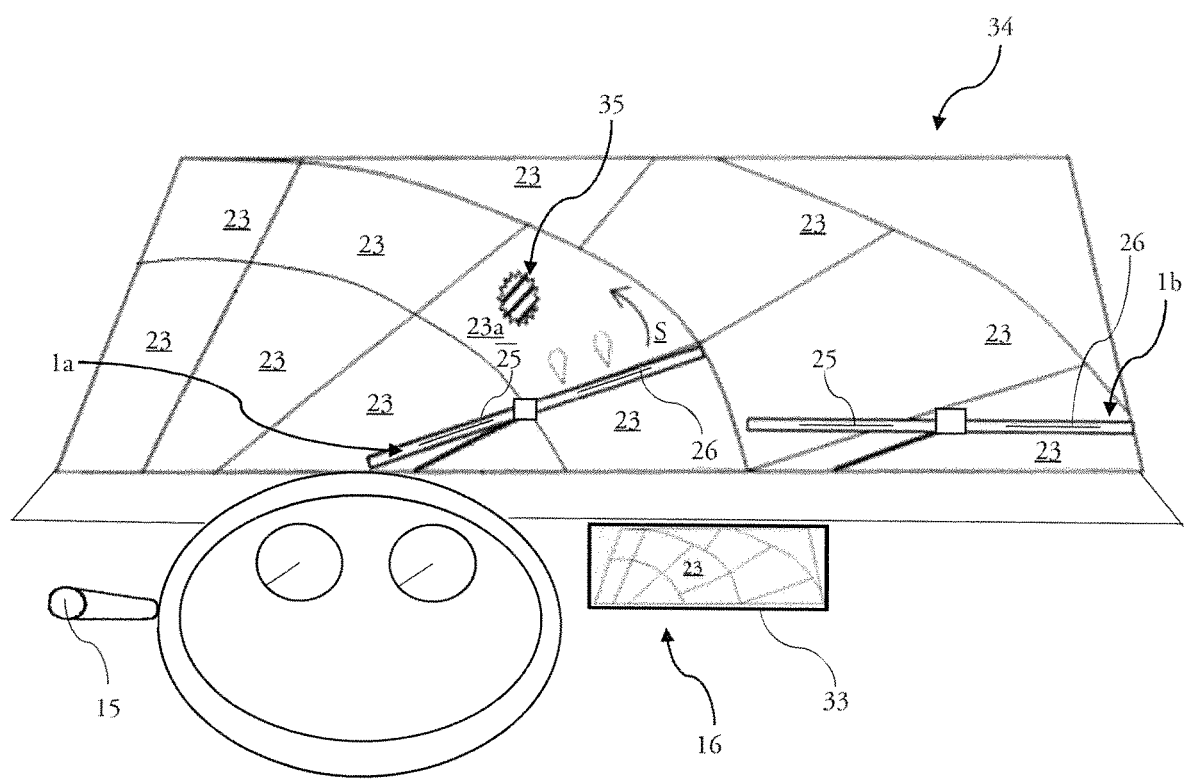

According to a first embodiment and a second embodiment represented respectively in FIGS. 7 and 8, the determination element 16 for the zone of the windscreen 34 comprises a camera 30 coupled to image processing software.

According to the first embodiment shown in FIG. 7, the camera 30 coupled to the image processing software is designed to determine a direction D1 in which the driver 31 of the vehicle 32 is looking. In order to trigger the cleaning of grime 35 present on the windscreen 34, the driver 31 must thus activate the determination element 16 and then look in the direction of this grime 35.

By cross referencing the direction D1 of the gaze of the driver 31 with the virtual slicing of the windscreen 34, the determination element 16 is able to determine which zone of the windscreen 34 the driver 31 is looking at and consequently to send image information as to the position of this zone on the windscreen 34 to the control module, which is itself designed to transmit one or more instructions enabling the cleaning of this zone of the windscreen, as described above.

According to the second embodiment shown in FIG. 8, the camera 30 coupled to the image processing software is designed to determine a direction D2 of orientation of an arm, a hand, or a finger of the driver 31, as illustrated in this FIG. 8. In order to trigger the cleaning of grime 35 present on the windscreen 34, the driver 31 must thus activate the determination element 16 and then make a gesture indicating the direction of this grime 35

By cross referencing the direction D2 of the gesture of the driver 31 with the virtual slicing of the windscreen 34, the determination element 16 is able to determine which zone of the windscreen the driver is designating with his or her arm, his or her hand, or his or her finger and consequently to send image information as to the position of this zone on the windscreen to the control module, which is itself designed to enable the cleaning of this zone of the windscreen, as described above.

FIG. 9 for its part illustrates a third embodiment of the cleaning system according to the present invention in which the determination element 16 is a screen 33 on which is displayed the virtual slicing of the windscreen 34. According to this third embodiment, the driver selects directly on the screen 33 the zone 23 of the windscreen to be cleaned.

According to one example of this third embodiment, illustrated in this FIG. 9, the screen 33 on which are displayed the different zones 23 of the windscreen is a touchscreen. The driver 31 must first of all activate the determination element 16 by using the activation means 15, for example implemented by a steering wheel control. Once activated, the determination element 16 enables the displaying of the different zones 23 on the screen 33, for example as a replacement of the radio. The driver 31 may then select the zone 23a of the windscreen 34 for which he or she wishes to set the cleaning system according to the present invention in operation by merely pressing on this zone 23a on the touchscreen 33. As for the other embodiments previously described, image information as to the position of this zone 23a on the windscreen 34 is then transmitted to the control module which can trigger the required cleaning, as explained above.

According to variants of this third embodiment, the selection of the zone 23a of the windscreen by the driver may be done by using a button situated at the periphery of the screen and controlling a mouse, or by using a pad to direct a mouse on the screen.

This third embodiment has the advantage of being simple to carry out.

It will be understood from reading the foregoing that the present invention proposes a cleaning system enabling a targeted cleaning of the windscreen, and more precisely a cleaning of at least one zone of this windscreen. This targeted cleaning advantageously allows a reduction in the quantity of liquid needed for the cleaning of said windscreen and, consequently, a reduction in the size of the reservoir containing this liquid, which results in a decrease in the weight of the vehicle and thus a decrease in the fuel consumption of this vehicle.

However, the invention is not limited to the means and configurations described and illustrated here, but likewise extends to all equivalent means or configurations and any technically feasible combination of such means. In particular, the form, and the disposition of the projection device of the liquid and of the determination element may be modified without harming the invention, as long as they fulfil the same functionalities as described in this document.

The invention claimed is:

1. A cleaning system for a windscreen of a motor vehicle, comprising:
    at least one drive arm;
    at least one wiper blade, the wiper blade being connected to the drive arm;
    at least one projection device able to project a liquid onto the windscreen;
    a determination element configured to determine a zone of the windscreen to be cleaned; and
    a switch to activate the determination element to determine a position of the zone on the windscreen to be cleaned,
    an activation of the drive arm and of the projection device being subject to image information as to the position of the zone on the windscreen transmitted by the determination element,
    wherein the determination element detects the zone of the windscreen to be cleaned by the direction in which a driver of the vehicle is looking.

2. The cleaning system according to claim 1, wherein the image information as to the position of the zone on the windscreen is received by a control module of the drive arm and of the projection device.

3. The cleaning system according to claim 1, wherein the projection device comprises a first part and a second part, each one assigned to different zones of the windscreen, the projection device having a controller configured for an independent projection of each of the parts of the projection device.

4. A motor vehicle comprising at least one cleaning system according to claim 1.

5. A method of cleaning a zone of a windscreen of a vehicle comprising:
- activation of a determination element for a zone of the windscreen;
- determination of the zone of the windscreen by the determination element, wherein the determination element determines a position of the zone of the windscreen to be cleaned;
- placing in motion a drive arm of a wiping device of the windscreen; and
- turning on a projection device of a liquid when a wiper blade carried by the drive arm enters the determined zone of the windscreen,
- wherein the determination element detects the zone of the windscreen to be cleaned by the direction in which a driver of the vehicle is looking.

6. The method of cleaning according to claim 5, further comprising stopping the projection device when the wiper blade leaves the zone of the windscreen.

\* \* \* \* \*